United States Patent
Chen et al.

(10) Patent No.: US 12,211,179 B2
(45) Date of Patent: Jan. 28, 2025

(54) METHOD, MEDIUM AND DEVICE FOR ENHANCING EVENT CAMERA IMAGE RECONSTRUCTION BY FUSING VISIBLE IMAGES

(71) Applicant: Zhejiang Gongshang University, Zhejiang (CN)

(72) Inventors: Weigang Chen, Zhejiang (CN); Yanbin Liu, Zhejiang (CN)

(73) Assignee: Zhejiang Gongshang University, Zhejiang (CN)

( * ) Notice: Subject to any disclaimer, the term of this patent is extended or adjusted under 35 U.S.C. 154(b) by 0 days.

(21) Appl. No.: 18/659,000

(22) Filed: May 9, 2024

(65) Prior Publication Data

US 2024/0378699 A1 Nov. 14, 2024

(30) Foreign Application Priority Data

May 11, 2023 (CN) .......................... 202310542996.8

(51) Int. Cl.
*G06T 5/50* (2006.01)
*G06V 10/54* (2022.01)
*G06V 10/771* (2022.01)

(52) U.S. Cl.
CPC .............. *G06T 5/50* (2013.01); *G06V 10/54* (2022.01); *G06V 10/771* (2022.01); *G06T 2207/20221* (2013.01)

(58) Field of Classification Search
CPC ............ G06T 5/50; G06T 2207/20221; G06V 10/771; G06V 10/54
USPC ........................................................ 345/629
See application file for complete search history.

(56) References Cited

PUBLICATIONS

Pablo Rodrigo Gantier Cadena et al., "SPADE-E2VID: Spatially-Adaptive Denormalization for Event-Based Video Reconstruction" (Year 2021), IEEE Transactionson Image Processing, vol. 30, Jan. 27, 2021, pp. 2488-2500, Year (2021).*
Henri Rebecq et al., "High Speed and High Dynamic Range Video with an Event Camera" (Year 2021), IEEE Transactions on Pattern Analysis and Machine Intelligence, vol. 43, No. 6, Jun. 2021, pp. 1964-1980, (Year 2021).*
Pablo Rodrigo Gantier Cadena et al., "SPADE-E2VID: Spatially-Adaptive Denormalization for Event-Based Video Reconstruction", IEEE Transactions on Image Processing, vol. 30, Jan. 27, 2021, pp. 2488-2500.
Cedric Scheerlinck et al., "Fast Image Reconstruction with an Event Camera", 2020 IEEE Winter Conference on Applications of Computer Vision (WACV), Mar. 1-5, 2020, pp. 1-9.

* cited by examiner

*Primary Examiner* — Hai Tao Sun
(74) *Attorney, Agent, or Firm* — JCIPRNET (57) ABSTRACT

The disclosure discloses a method, a medium, and a device for enhancing event camera image reconstruction by fusing visible images, and belongs to the field of image processing. In order to solve the problem that the reconstructed image of the event camera is likely affected by noise and lacks of photorealistic, the method provided by the disclosure adopts an enhancement module based on the improved Transformer model to fuse the intensity image reconstructed from the event stream and the reference image selected from the visible image sequence captured by an optical sensor, so that makes the reconstructed image has an appearance close to the visible image while maintaining the characteristics of high dynamic range of the event camera.

16 Claims, 4 Drawing Sheets

Divide Event streams into sequential non-overlapping spatio-temporal windows with a fixed time interval, use the events in each window as an input of a reconstruction module to obtain an reconstructed image. — S1

Use a timestamp corresponding to a center position of the spatio-temporal window as a reference moment for each window; take a nearest visible image before the reference moment and a nearest visible image after the reference moment, which are synchronously recorded by the event camera, as a first visible image and a second visible image, respectively; label a timestamp corresponding to the first visible image as a first moment, and label a timestamp corresponding to the second visible image as a second moment; if a total number of events between the first moment and the reference moment is less than a total number of events between the reference moment and the second moment, then use the first visible image as a reference image, otherwise use the second visible image as the reference image. — S2

Form a sample pair for each spatio-temporal window, one image in the pair is the reconstructed image of the event stream in the window and the other is the reference image of the window; input the sample pair into an enhancement module, perform texture feature migration on the reconstructed image and finally output an enhanced image which has an appearance close to the reference image for each spatio-temporal window. — S3

METHOD, MEDIUM AND DEVICE FOR ENHANCING EVENT CAMERA IMAGE RECONSTRUCTION BY FUSING VISIBLE IMAGES

CROSS-REFERENCE TO RELATED APPLICATION

This application claims the priority benefit of China application serial no. 202310542996.8, filed on May 11, 2023. The entirety of the above-mentioned patent application is hereby incorporated by reference herein and made a part of this specification.

BACKGROUND

Technical Field

The disclosure relates to the field of image processing, and in particular to a method, medium and device for enhancing event camera image reconstruction by fusing visible images.

Description of Related Art

The event camera detects the brightness change of each pixel independently in an asynchronous manner, and outputs the corresponding polarity signal when the relative brightness change at a certain position exceeds a threshold. Compared with conventional cameras capturing visible images at a fixed frame rate, event cameras have the characteristics of high temporal resolution and high dynamic range.

Currently, most machine vision-related systems (such as target detection, recognition, and tracking) take grayscale or color images as input, which puts forward technical demands for reconstructing high-frame-rate intensity images from event streams. However, the principle of event camera recording event information determines that the event camera is significantly sensitive to changes of environment illumination, and inevitably contains a large amount of noise in the output event stream, and further results in reconstructed images being affected by various image noise. Fortunately, most current event cameras not only record event streams, but also output visible images at a certain frame rate (such as 25 frames/second), which makes it possible to enhance the intensity image reconstructed from the event stream with the help of the visible images.

SUMMARY

The purpose of the disclosure is to solve the problems presenting in the existing technology and provide a method, medium and device for enhancing event camera image reconstruction by fusing visible images.

The specific technical solutions adopted by embodiments of the disclosure are as follows.

In the first aspect, the disclosure provides a method for enhancing event camera image reconstruction by fusing visible images, and the method includes the following.

S1. Event streams produced by an event camera are divided into sequential non-overlapping spatio-temporal windows with a fixed time interval, and the events in each window is used as an input of a reconstruction module to obtain a reconstructed image corresponding to the events.

S2. For each spatio-temporal window, a timestamp corresponding to a center of the window is used as a reference moment, a nearest visible image before the reference moment and a nearest visible image after the reference moment, which are synchronously recorded by the event camera, are taken as a first visible image and a second visible image respectively, and a timestamp corresponding to the first visible image is labeled as a first moment, a timestamp corresponding to the second visible image is labeled as a second moment. In a spatio-temporal window, if a total number of events between the first moment and the reference moment is less than a total number of events between the reference moment and the second moment, then the first visible image is used as a reference image corresponding to the spatio-temporal window, otherwise the second visible image is used as the reference image corresponding to the window.

S3. A sample pair is formed for each spatio-temporal window, one image in the pair is the reconstructed image of the event stream in the window and the other is the reference image of the window, the sample pair is input into an enhancement module, texture feature migration is performed on the reconstructed image and finally an enhanced image corresponding to each spatio-temporal window which has an appearance close to the reference image is output by the enhancement module.

As a preferable option for the first aspect, the reconstruction module may be SPADE-E2VID or Firenet.

As a preferable option for the first aspect, in the event streams produced by the event camera, an event is represented as a quadruple of position coordinates, the timestamp, and an event polarity, values of the event polarity are +1 and −1, +1 represents an event of brightness increase, and −1 represents an event of brightness decrease.

As a preferable option for the first aspect, in S2, for each spatio-temporal window, when selecting the reference image from the first visible image and the second visible image, a sum of absolute values of the polarities of all events between the first moment and the reference moment is calculated as a first statistical value, a sum of absolute values of the polarities of all events between the reference moment and the second moment is calculated as a second statistical value, if the first statistical value is less than the second statistical value, then the first visible image is selected as the reference image, otherwise the second visible image is selected as the reference image corresponding to the spatio-temporal window.

As a preferable option for the first aspect, the enhancement module includes an input layer, an image feature extraction module, a texture feature extraction module, a correlation calculation module, a feature migration module, and an output layer.

The input layer includes a convolutional layer followed by a ReLU activation function, the reconstructed image z and the reference image v in the sample pair share the input layer, and after being processed by the input layer, a feature map $M_z$ corresponding to the reconstructed image z and a feature map $M_v$ corresponding to the reference image v are output.

The image feature extraction module and the texture feature extraction module are connected in parallel after the input layer, the image feature extraction module consists of five sequentially connected residual modules, and the texture feature extraction module adopts a U-Net network; the feature map $M_z$ and the feature map $M_v$ are formed as an image feature map Z and an image feature map V respectively after passing through the image feature extraction module, the feature map $M_z$ and the feature map $M_v$ are formed as a texture feature map Q and a texture feature map K respectively after passing through the texture feature extraction module; and sizes of the image feature map Z, the image feature map V, the texture feature map Q, and the texture feature map K are the same.

In the correlation calculation module, each position on the texture feature map Q and the texture feature map K are first scanned, during the scanning process, a unique order number is assigned to each of the scanned positions, values of all channels at a scanned position are extracted from the feature map to form a feature vector, the feature vector extracted from the position with an order number i on the texture feature map Q is $q_i$, the feature vector extracted from the position with an order number j on the texture feature map K is $k_j$; a correlation value between a feature vector extracted from each of the positions on the texture feature map Q and a feature vector extracted from each of the positions on the texture feature map K is calculated, for the position with the order number i on the texture feature map Q and the position with the order number j on the texture feature map K, the correlation value is a normalized inner product of the feature vector $q_i$ and the feature vector $k_j$; for any position (m, n) with the order number i on the texture feature map Q, a maximum correlation value between feature vector extracted from this position and vectors from all of the positions on the texture feature map K is searched and stored as S(m, n) in a weight map S, and if a position with an order number j* on the feature map K responses the maximum correlation value, the order number is recorded in a position index map P as P(m, n)=j*, and thereby the weight map S and the position index map P of the same size as the texture feature map Q are generated.

In the feature migration module, according to the position order number j* recorded at each of the positions (m, n) in the position index map P, a position (m', n') on the texture feature map K is determined, all channel values at the position (m', n') are extracted from the image feature map V and used as channel values at the position (m, n) in a reconstructed feature map T, thereby the reconstructed feature map T is formed; then the image feature map Z and the reconstructed feature map T are concatenated along a channel dimension, a concatenated feature map is performed a convolution operation to form a fused feature map $Z_s$, and the fused feature map $Z_s$ and the weight map S are weighted through element-wise multiplication and then added to the image feature map Z, thereby an output of the feature migration module is formed as $Z_o$.

In the output layer, the feature map $Z_o$ passes through two convolutional layers, follows a Sigmoid activation operation, then a final enhanced image is generated.

As a preferable option for the first aspect, in the input layer, the convolutional layer consists of 64 convolutional kernels with a size of 3×3×$C_{in}$ and a stride of 1, $C_{in}$ is a number of channels of the reconstructed image and the reference image.

As a preferable option for the first aspect, for the two convolutional layers in the output layer, a first convolutional layer consists of 32 convolutional kernels of 3×3, a second convolutional layer consists of 3 convolutional kernels of 3×3, and both of the two layers are with a stride of 1.

As a preferable option for the first aspect, network parameters at each layer in the enhancement module are trained in advance using a training dataset; each training sample comprises a set of the reconstructed image, the reference image, and a real visible image correspondingly; the reconstructed image and the reference image are used as inputs to the enhancement module, and the real visible image is used as a ground truth; a total loss function for training is a weighted sum of a structural similarity loss function, a mean square error loss function, and a perceptual loss function; and the perceptual loss function adopts VGG19 as a perceptual model.

In the second aspect, the disclosure provides a non-transitory computer-readable storage medium. A computer program is stored on the storage medium. When the computer program is executed by a processor, the method for enhancing event camera image reconstruction by fusing visible images as described in any one options of the first aspect may be realized.

In the third aspect, the disclosure provides a computer electronic device, which includes a storage and a processor.

The storage is used to store a computer program.

The processor is used to implement the method for enhancing event camera image reconstruction by fusing visible images as described in any one options of the first aspect when executing the computer program.

DESCRIPTION OF THE EMBODIMENTS

The disclosure is further described below together with the accompanying drawings and specific embodiments, so that persons skilled in the art may better understand the essence of the disclosure.

Figure 1:
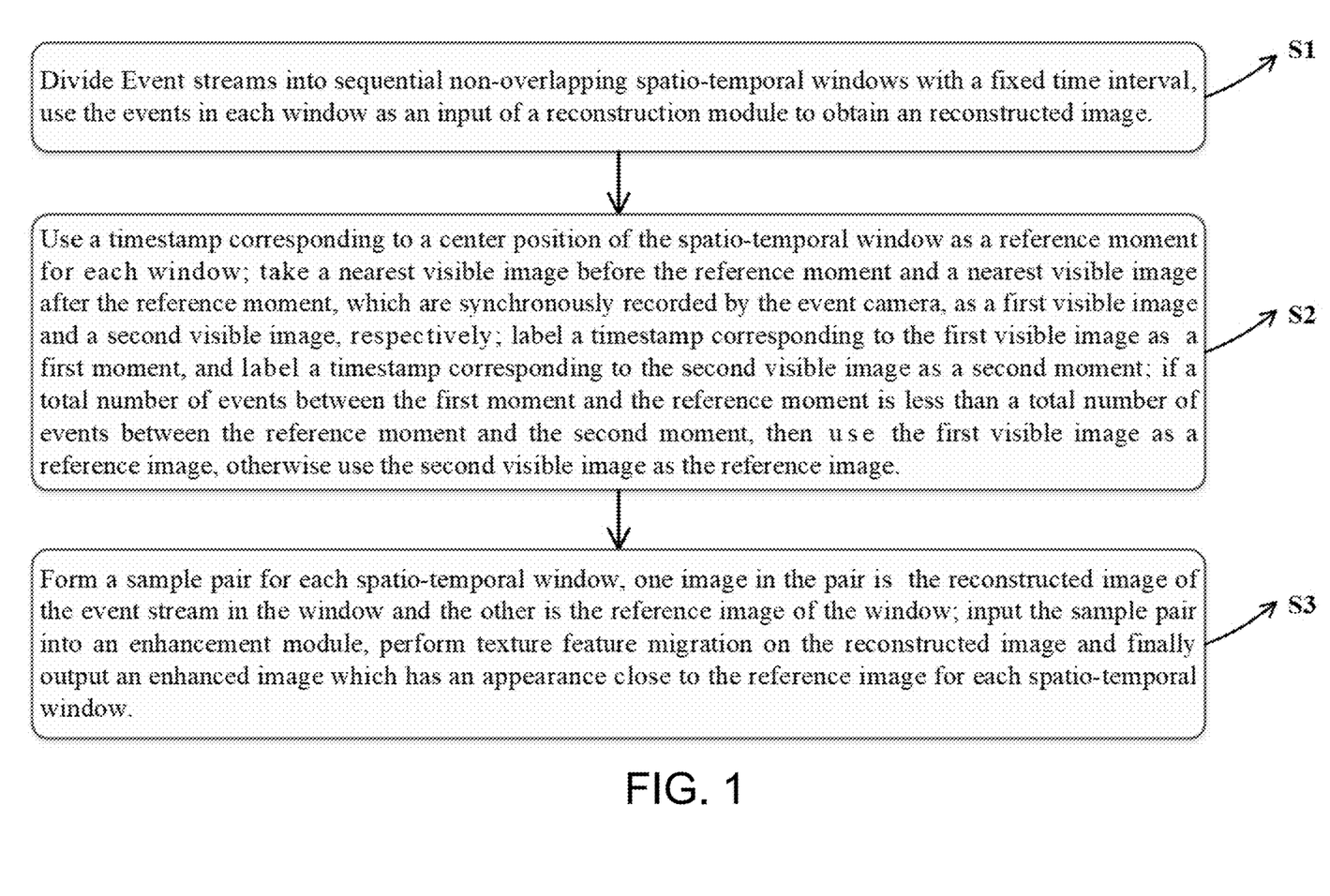
FIG. 1 is a schematic diagram of a method for enhancing event camera image reconstruction by fusing visible images according to an embodiment of the disclosure.

As shown in FIG. 1, in a preferred embodiment of the disclosure, a method for enhancing event camera image reconstruction by fusing visible images is provided. The method takes intensity images output by a reconstruction module and reference images selected from a visible image sequence captured by an optical sensor as input, and adopts an enhancement module based on an improved Transformer model to perform enhancement. In this embodiment, the enhancement method specifically includes the following three basic steps. The specific methods of each step are described in detail below.

Step (1). Event streams produced by an event camera are divided into sequential non-overlapping spatio-temporal windows with a fixed time interval. An event stream in each spatio-temporal window is used as the input of the reconstruction module, and a reconstructed image corresponding to the window is output by the reconstruction module.

In an embodiment of the disclosure, events in the event stream produced by the event camera need to be partitioned into the spatio-temporal windows with no overlapping areas, and then the events may be used as the input of the reconstruction module. The output of the reconstruction module is a reconstructed intensity image. In the event stream produced by the event camera, each event is represented as a quadruple of position coordinates, a timestamp, and an event polarity. Specifically, the event is represented in the form of a tuple $e_n=(x_n, y_n, t_n, p_n)$, in which $(x_n, y_n)$ represents the position coordinates of the nth event, $t_n$ represents the timestamp, $p_n$ represents the polarity, and its value depends on whether the brightness change at the position $(x_n, y_n)$ from the time point of the last trigger event to the current time exceeds a preset threshold E. If the brightness change exceeds E, and the brightness increases, then $p_n=+1$, which represents an event of brightness increase; on the contrary, if the brightness change exceeds E, and the brightness decreases, then $p_n=-1$. Secondly, assuming that a starting time of a certain spatio-temporal window is $t_0$, and the time interval of the window is $\Delta T$, then events with timestamps greater than or equal to $t_0$ and less than $t_0+\Delta T$ are classified as events within the spatio-temporal window. By using the event stream in the spatio-temporal window as the input, the reconstruction module will reconstruct an intensity image corresponding to the window.

In an embodiment of the disclosure, the reconstruction module may be SPADE-E2VID (SPADE-E2VID: Spatially-Adaptive Denormalization for Event-Based Video Reconstruction, IEEE Transactions on Image Processing, vol. 30, 2021). Certainly, in other embodiments, the reconstruction module may also use Firenet (Fast Image Reconstruction with an Event Camera, Proc. IEEE/CVF WACV, 2020.3). The two reconstruction modules belong to the existing technology, so details will not be described further.

Step (2). The reference image corresponding to the reconstructed image of each spatio-temporal window is determined.

For each spatio-temporal window, a timestamp corresponding to a center position of the window is used as a reference moment, a nearest visible image before the reference moment and a nearest visible image after the reference moment, which are synchronously recorded by the event camera, are taken as a first visible image and a second visible image respectively, and a timestamp corresponding to the first visible image is labeled as a first moment, a timestamp corresponding to the second visible image is labeled as a second moment. In the spatio-temporal window, if a total number of events between the first moment and the reference moment is less than a total number of events between the reference moment and the second moment, then the first visible image is used as the reference image, otherwise the second visible image is used as the reference image corresponding to the spatio-temporal window.

Figure 2:
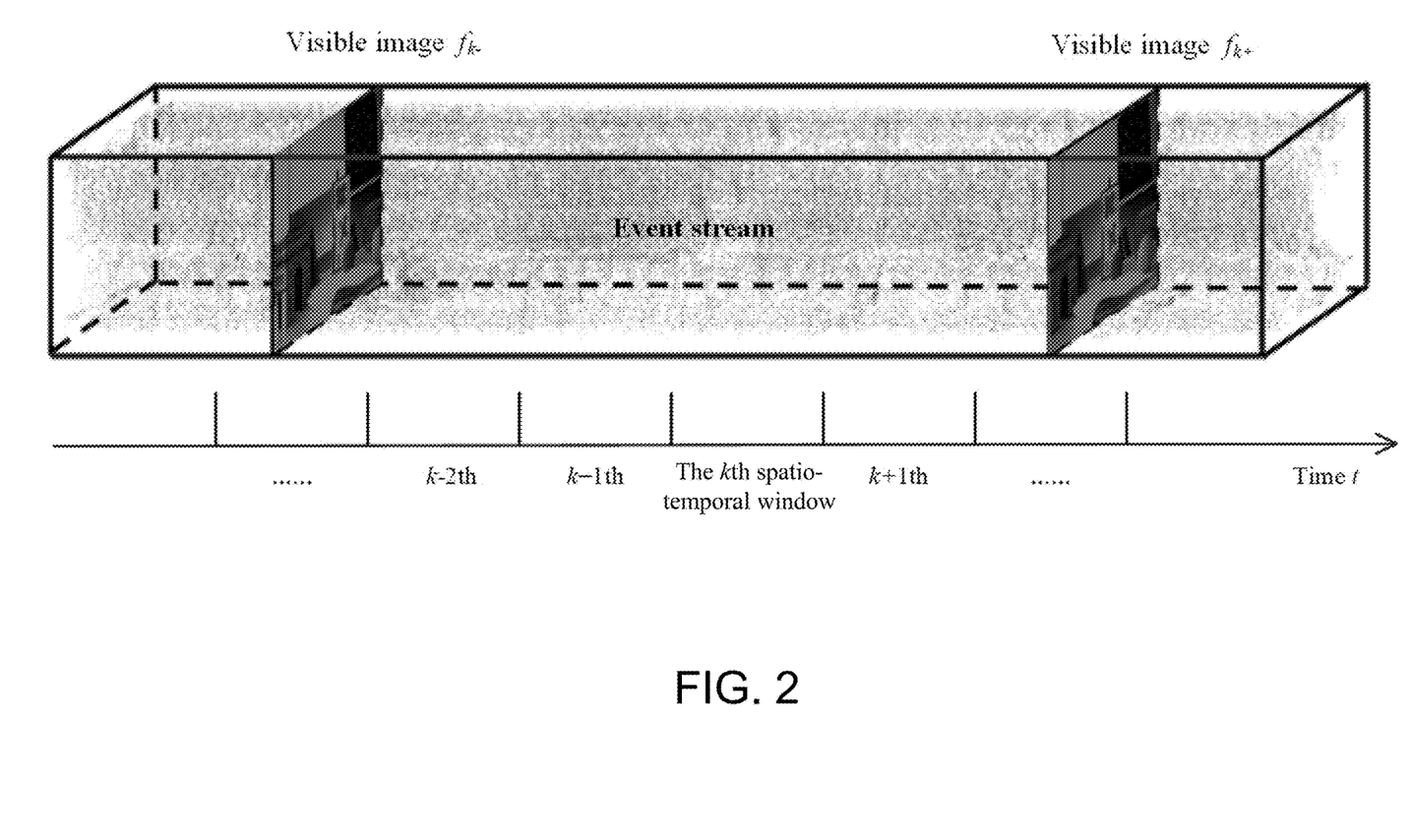
FIG. 2 is a schematic diagram of an event stream and visible images captured by an event camera and spatio-temporal window division.

Specifically, reference may be made to FIG. 2 for details. On the one hand, the event camera records scene brightness changes in the form of the event stream. At the same time, visible images are also captured by the optical sensor and output as image sequences. However, the interval between two adjacent frames in the sequence is typically larger than the time span of a spatio-temporal window. Therefore, the events between two adjacent visible images are partitioned into multiple windows. Assuming that the timestamp corresponding to the center position of the kth spatio-temporal window is $t_k$, one visible image is captured at a certain time $t_{k-}$ before $t_k$ and denoted as a first visible image $f_{k-}$, another is captured at a certain time $t_{k+}$ after $t_k$ and denoted as a second visible image $f_{k+}$. It should be noted that $t_{k-}$ should be the moment before $t_k$ but closest to $t_k$ when a visible image captured, similarly, $t_{k+}$ should be the moment after $t_k$ but closest to $t_k$ when a visible image captured. A total number of events in a time range may be obtained by calculating the sum of the absolute values of the polarities of all events in the range. Therefore, in an embodiment of the disclosure, the sum of the absolute values of the polarities of all events within the time range from $t_{k-}$ to $t_k$ may be calculated as a first statistical value $P_-$; the sum of the absolute values of the polarities of all events within the time range $t_k$ to $t_{k+}$ is calculated as a second statistical value $P_+$; if $P_-<P_+$, then the first visible image $f_{k-}$ is selected as the reference image, otherwise the second visible light image $f_{k+}$ is selected as the reference image.

Step (3). A sample pair is formed for each spatio-temporal window, one image in the pair is the reconstructed image of the event stream in the window and the other is the reference image of the window, the sample pair is input into an enhancement module, texture feature migration is performed on the reconstructed image and finally an enhanced image corresponding to each spatio-temporal window which has an appearance close to the reference image is output by the enhancement module.

Figure 3:
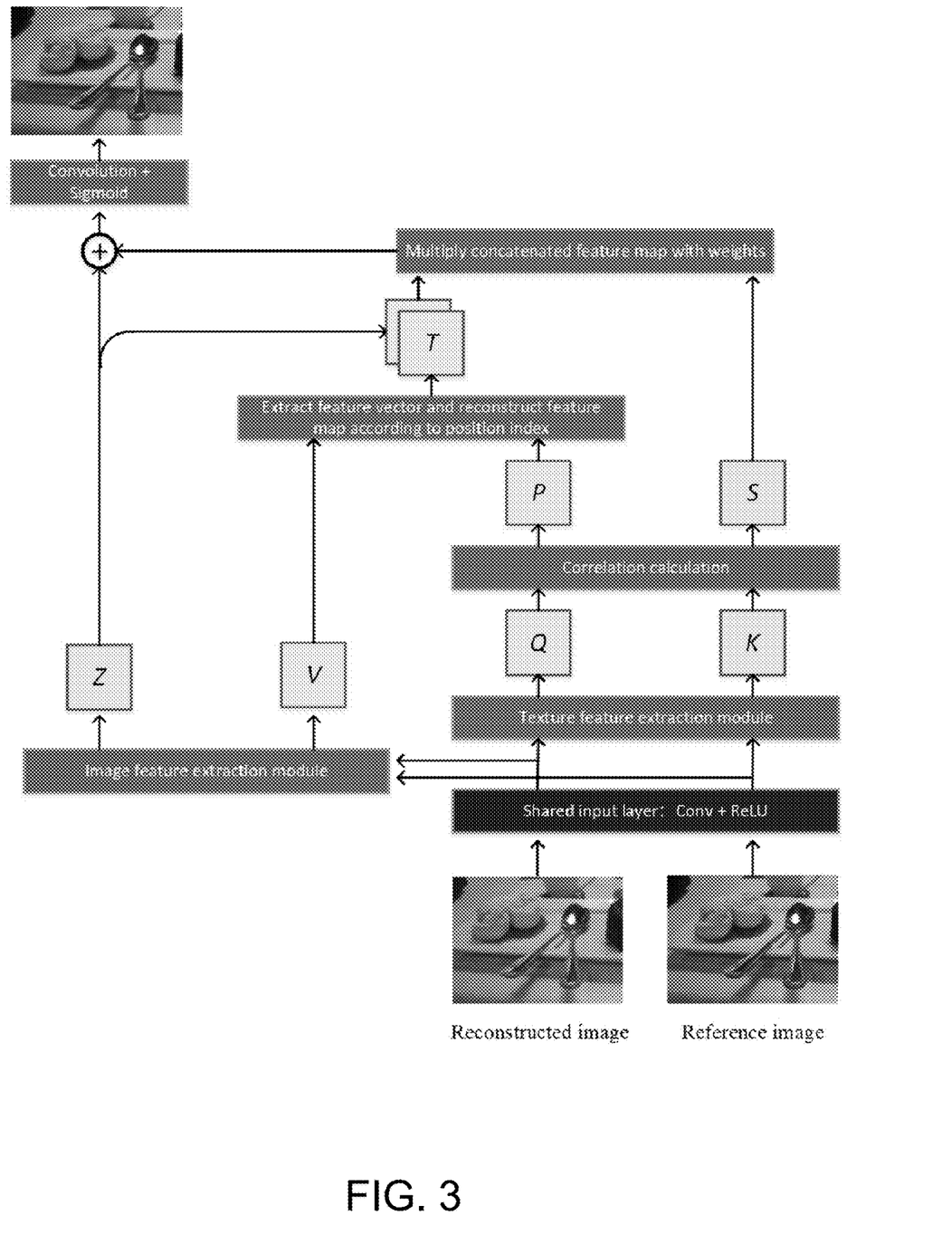
FIG. 3 is a schematic structural diagram of an enhancement module.

As shown in FIG. 3, in an embodiment of the disclosure, the improved Transformer model is adopted as the enhancement module. For any sample pair (z, v) comprising a reconstructed image z and a reference image v, the reconstructed image and the reference image have the same width W and height H. The enhancement module includes an input layer, an image feature extraction module, a texture feature extraction module, a correlation calculation module, a feature migration module, and an output layer. The processing steps during forward propagation are as follows.

Step A. Input data is processed by the input layer.

First, for each sample pair, the reconstructed image z and the reference image v are input to a shared input layer respectively. After being processed by the input layer, a feature map $M_z$ corresponding to z and a feature map $M_v$ corresponding to v are output. The input layer includes a convolutional layer followed by a ReLU activation function. The convolutional layer in this embodiment contains 64 convolutional kernels with a size of $3\times3\times C_{in}$, in which $C_{in}$ is a number of channels of the reconstructed image or the reference image, $C_{in}=1$ for grayscale images, $C_{in}=3$ for color images, and the stride of the convolutional layer is 1.

Step B. Image features and texture features are generated by the image feature extraction module and the texture feature extraction module respectively.

Following the input layer are two parallel feature extraction modules, one of the two modules is the image feature extraction module, and the other is the texture feature extraction module. After the feature maps $M_z$ and $M_v$ pass through the image feature extraction module, image feature maps Z and V are formed respectively; after $M_z$ and $M_v$ pass through the texture feature extraction module, texture feature maps Q and K are formed respectively. The sizes of the feature maps Z, V, Q, and K are all W×H×C, in which C is a number of channels of the feature maps. In an embodiment of the disclosure, the number is C=64. Therefore, K, Q, and V form the three elements of the Transformer model, namely Key, Query, and Value, used for subsequent correlation calculation and feature migration.

In a preferred embodiment of the disclosure, the image feature extraction module following the input layer comprises five sequentially connected residual modules. Each residual module has the same structure, which includes two portions. Let $A_0$ be the feature map input to the residual module. In a first portion of the residual module, a channel-direction layer normalization operation is first performed on $A_0$. Following are two convolutional layers, the first convolutional layer contains 128 convolutional kernels with a size of 1×1 and with stride 1, the second convolutional layer adopts group convolution and contains 128 convolutional kernels with a size of 3×3, the padding size is 1, the number of groups is 128, and the stride is 1. The 128 channels feature map output by the second convolutional layer is divided into two 64-channel feature maps along the channel dimension, and in a manner of element-wise multiplication, a new feature map is calculated from these two feature maps, denoted as $A_1$. An adaptive average pooling operation is performed on $A_1$ to form a feature map $A_2$ of size 1×1×64. Values of all positions of $A_1$ in a certain channel are multiplied by the value of $A_2$ in that channel, and the operation is repeated for all channels to form a modified feature map $A'_1$. $A'_1$ passes through the subsequent convolutional layer containing 64 convolutional kernels with a size of 1×1 and a stride of 1, and a feature map formed is element-wise summed with $A_0$ and served as the output of the first portion of the residual module, denoted as $A_3$. In a second portion of the residual module, a channel-direction layer normalization is first performed on $A_3$. Following is a convolutional layer containing 128 convolutional kernels with a size of 1×1 and a stride of 1. The feature map output by the convolutional layer is partitioned into two feature maps along the channel dimension. Each feature map contains 64 channels. In a manner of element-wise multiplication, a new feature map is calculated from these two feature maps, denoted as $A_4$. Finally, the feature map generated by feeding forward $A_4$ through the subsequent convolutional layer containing 64 convolutional kernels of size 1×1 and with a stride of 1 is element-wise summed with $A_3$ and served as the final output of the residual module.

In a preferred embodiment of the disclosure, the texture features extraction module following the input layer adopts the U-Net network structure. Assuming that the feature map input to the texture feature extraction module is $B_0$, a feature map $B_1$ is formed by passing $B_0$ through two sequentially connected convolutional layers and the following pooling operation, in which each of the two convolutional layers contains 128 convolutional kernels with a size of 3×3 and stride 1, and the pooling layer performs maximum pooling with sampling stride 2. A feature map $B_2$ is formed after $B_1$ passes through two sequentially connected convolutional layers and the subsequent pooling operation, in which each of the two convolutional layers contains 256 convolutional kernels with a size of 3×3 and stride 1, the pooling layer performs maximum pooling with sampling stride 2. A feature map $B_3$ is formed after $B_2$ passes through two sequentially connected convolutional layers, in which each of the two convolutional layers contains 128 convolutional kernels with a size of 3×3 and stride 1. In a manner of bicubic interpolation, $B_3$ is enlarged into a feature map with the same size as $B_1$. Then, the enlarged feature map is element-wised summed with $B_1$ to form a feature map $B_4$. A feature map $B_5$ is formed after $B_4$ passes through a convolutional layer containing 64 convolutional kernels with a size of 3×3 and a stride of 1. In a manner of bicubic interpolation, $B_5$ is enlarged into a feature map with the same size as $B_0$. Then, the enlarged feature map is element-wised summed with $B_0$ to form a feature map $B_6$. Finally, $B_6$ passes through a convolutional layer containing 64 convolutional kernels with a size of 3×3 and a stride of 1, and a final output of the texture feature extraction module is generated.

Step C. A position index map and a weight map are generated by the correlation calculation module.

In the correlation calculation module, in a manner of normalized inner product, a correlation between the texture feature map Q and the texture feature map K is calculated, and the position index map and the weight map are generated. Specifically, first, a plane with a size of W×H corresponding to the texture feature map Q is scanned in row-major order, a unique order number i is assigned to each scanned position, $1 \leq i \leq H \times W$, and values of all channels of the feature map Q are extracted sequentially in a channel order at the scanned position corresponding to the order number i to form a feature vector, denoted as $q_i$. Then, a plane with a size of W×H corresponding to the texture feature map K is scanned in row-major order, a unique order number j is assigned to each scanned position, and values of all channels of the feature map K are extracted sequentially in a channel order at the scanned position corresponding to the order number j to form a feature vector, denoted as $k_j$, in which $1 \leq j \leq H \times W$. Then, in the manner of normalized inner product, the correlation between vectors $q_i$ and $k_j$ is calculated according to the correlation formula as follows.

$$r_{i,j} = \left\langle \frac{q_i}{\|q_i\|}, \frac{k_j}{\|k_j\|} \right\rangle \quad (1)$$

In the formula, $r_{i,j}$, is the correlation between the feature vector extracted from position with the order number i on the texture feature map Q and the feature vector extracted from position with the order number j on the texture feature map K, $\langle \cdot \rangle$ represents inner product operation, and $\|\cdot\|$ represents 2-norm.

For any position (m, n) with the order number i, a maximum correlation value between feature vector extracted from this position and all vectors from the positions on the texture feature map K is searched and stored in a weight map S as S(m, n), and if a position with an order number j* on the feature map K responses the maximum correlation value the order number is recorded in a position index map P as P(m, n)=j*, and thereby the weight map S and the position index map P are generated, where S and P have the same size as Q. Specifically, for any position corresponding to the order number i on the texture feature map Q, H×W correlation values may be calculated according to the correlation formula, a maximum value may be searched among the correlation values and stored to the weight map S; at the same time, the order number j* corresponding to the maximum correlation value is stored in the position index map P.

The weight map $S \in \mathbb{R}^{W \times H \times 1}$ in which each element characterizes a degree of similarity between a feature of the feature map Q and a most similar feature in K, which is determined according to the formula as follows.

$$S(m, n) = \max_j (r_{i,j}) \quad (2)$$

In the formula, (m, n) is the scanned position corresponding to the order number i, $1 \leq m \leq H$, and $1 \leq n \leq W$.

The position index map $P \in \mathbb{R}^{W \times H \times 1}$, in which a value P(m, n) of the scanned position corresponding to the order number i is an order number of a feature most similar to the feature vector $q_i$ of the feature map Q in the feature map K, which is determined as follows.

$$P(m, n) = j^* = \arg\max_j (r_{i,j}) \quad (3)$$

Step D. Feature migration is performed by the feature migration module.

The value P(m, n) is an index value, which is an order number j* and has a one-to-one correspondence with the position (m', n') on the H×W plane corresponding to the texture feature map K. Therefore, for each position (m, n) in the position index map P, the position (m', n') on the texture feature map K may be determined based on the order number j*, then all channel values at the position (m', n') are extracted from the image feature map V and used as channel values at the position (m, n) in a reconstructed feature map T, thereby the reconstructed feature map T is formed. This operation is also equivalent to extracting all channel values at the position (m', n') of the feature map V in the channel order to form a vector comprising C elements, the vector extraction operation is repeated for all positions in the position index map, and H×W vectors obtained in this way may be reassembled into a feature map of H×W×C, which is T. The image feature map Z and the reconstructed feature map T are concatenated along the channel dimension to form a concatenated feature map of size H×W×2C, the concatenated feature map passes through a convolutional layer comprising 64 kernels with a size of 3×3 and a stride of 1 to form a fused feature map $Z_s$. All elements $Z_s(m, n, c)$ of the fused feature map $Z_s$ and the weight map S are weighted through element-wise multiplication, that is, Z(m, n, c) is multiplied by value S(m, n) of the weight map at the (m, n), $1 \leq m \leq H$, $1 \leq n \leq W$, $1 \leq c \leq C$, the weighted result is then element-wise summed with the feature map Z, and a feature map $Z_o$ after feature migration is formed.

The feature migration operation may be expressed as follows.

$$Z_o = Z + \text{Conv}(\text{Concat}(Z,T)) \odot S \quad (4)$$

In the formula, Conv represents the convolution operation, Concat represents the concatenating along the channel dimension, and $\odot$ represents the element-wise multiplication operation.

It should be noted that the feature map formed by feature migration is concatenated along the channel dimension with the feature map formed after the reconstructed image being processed by the image feature extraction module. Therefore, in an embodiment of the disclosure, for the position corresponding to an order number, the channel values of feature map V (rather than that of feature map K) are extracted to form the feature map used for concatenating, since V is formed after the reference image being processed by the image feature extraction module, while K is formed after being processed by the texture feature extraction module.

Step E. An enhanced image is generated from the output layer.

The final enhanced image is formed after $Z_o$ passing through two convolutional layers and a subsequent Sigmoid operation, in which the first convolutional layer contains 32 convolutional kernels with a size of 3×3, the second convolutional layer contains 3 convolutional kernels with a size of 3×3, and both convolutional layers are with a stride of 1.

It should be noted that before using the enhancement module provided by the disclosure to enhance the event camera reconstructed images, the module needs to be trained to determine the parameters of each layer in a learning manner.

Assuming that a training sample set used for model learning is $D=\{(z_k, v_k, g_k)\}_{k=1}^{N}$, in which $z_k$ represents the intensity image output by the reconstruction module, $v_k$ represents the reference image, $g_k$ is the real visible image captured by an optical sensor during the time period corresponding to the event stream for reconstructing $z_k$, and N is the number of samples in the set. The reconstructed image $z_k$ and the reference image $v_k$ are used as inputs to the enhancement module, and the real visible image $g_k$ is used as the ground truth.

During the training, any sample $z_k$ and $v_k$ in D may be input to the enhancement module, and if the enhanced image output by the enhancement module is $\tilde{g}_k$, then a total loss function L corresponding to $\tilde{g}_k$ and $g_k$ is calculated according to the formula as follows.

$$L = \alpha_1 L_{SSIM} + \alpha_2 L_{MSE} + \alpha_3 L_{LPIPS} \quad (5)$$

In the formula, $\alpha_1$, $\alpha_2$, and $\alpha_3$ are preset coefficients used to balance the contributions of loss functions $L_{SSIM}$, $L_{MSE}$, and $L_{LPIPS}$, and in an embodiment of the disclosure, $\alpha_1=1.0$, $\alpha_2=5.0$, $\alpha_3=0.8$.

In the total loss function, $L_{SSIM}$ is the structural similarity loss function and is calculated as follows.

$$L_{SSIM} = 1 - \text{SSIM}(\tilde{g}_k, g_k) \quad (6)$$

In the formula, SSIM( ) is a function used to calculate the structural similarity index metric of two images.

In the total loss function, $L_{MSE}$ is the mean square error loss function, which represents the mean square error calculated by comparing $\tilde{g}_k$ and $g_k$ pixel by pixel.

In the total loss function, $L_{LPIPS}$ is the perceptual loss function, VGG19 is adopted as the perceptual model. $\tilde{g}_k$ and $g_k$ are input respectively to the pre-trained perceptual model to extract features, corresponding feature maps are output by each layer of the VGG model, and activated and normalized. The output feature maps of the lth layer are denoted as $\tilde{G}_l$ and $G_l$, a preset weight $w_l$ is assigned to the output of the layer, and the perceptual loss function $L_{LPIPS}$ is calculated as follows.

$$L_{LPIPS} = \Sigma_l \|w_l(G_l - \tilde{G}_l)\|_1 \quad (7)$$

In the formula, $\|\bullet\|_1$ represents 1-norm.

The training of the model is similar to the conventional method. All samples in the training sample set D may be input to the enhancement module in batches, with the goal of minimizing the sum of the loss function L calculated according to the total loss function formula for all samples, the parameters of each network layer of the enhancement module are updated and adjusted through backpropagation until the model converges.

Figure 4:
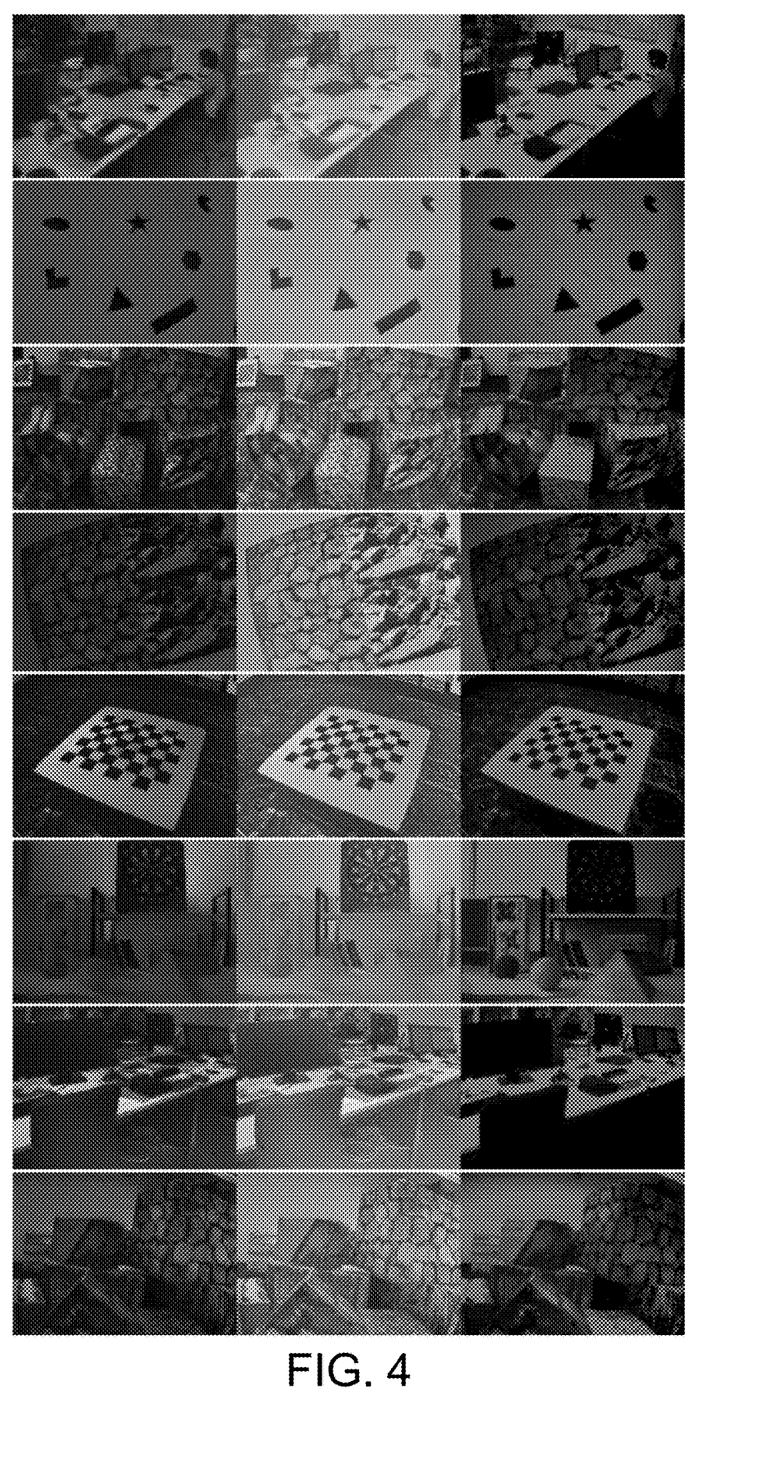
FIG. 4 is an example of results of applying the method provided by the disclosure to enhance reconstructed images of the event camera.

As shown in FIG. 4, FIG. 4 shows some results obtained by enhancing the reconstructed images of the event camera using the method provided by an embodiment of the disclosure. The images show eight different scenes. From left to right, each row of images is the output of the enhancement module, the image reconstructed by the reconstruction module (i.e., SPADE-E2VID), and the visible image captured by an optical sensor. As may be seen from the images, the enhanced image is not only similar to the real grayscale image, but also maintains the high dynamic range characteristics of the event camera, some details missing from the grayscale image due to wide dynamic range are reconstructed, for example, as shown in the first row of FIG. 4 of the left image, details of the person and the chair are shown. At the same time, in an embodiment of the disclosure, the real visible image is used as a reference; the mean square error MSE, the structural similarity index metric SSIM, the learned perceptual image patch similarity LPIPS are used as objective measurement, and experimental tests are conducted on multiple test data sets. The test results are shown in the following Table 1. The "Reconstructed Image" column in the table gives the test results calculated from the reconstructed image output by the reconstruction module and the reference image, and the "Enhanced Image" column gives the test results calculated from the image enhanced by the enhancement module of an embodiment of the disclosure and the reference image. It should be seen from the results in FIG. 4 and Table 1 that the event camera reconstructed image enhancement method provided by embodiments of the disclosure can greatly improve the visual effect of the reconstructed image, the errors measured in MSE and LPIPS between the reconstructed image and the real visible image are reduced, and the structural similarity index metric measured in SSIM is increased.

TABLE 1

Comparison of MSE, SSIM, and LPIPS results between the enhanced reconstructed image and the original reconstructed image

| Dataset | MSE | | SSIM | | LPIPS | |
| --- | --- | --- | --- | --- | --- | --- |
| | Reconstructed image | Enhanced image | Reconstructed image | Enhanced image | Reconstructed image | Enhanced image |
| dynamic_6dof | 0.09295 | 0.04708 | 0.3807 | 0.4226 | 0.6517 | 0.5052 |
| boxes_6dof | 0.04217 | 0.04059 | 0.5624 | 0.5831 | 0.6621 | 0.6169 |
| poster_6dof | 0.05214 | 0.02781 | 0.5554 | 0.6277 | 0.6194 | 0.4725 |
| office_zigzag | 0.05818 | 0.04003 | 0.4376 | 0.4785 | 0.7344 | 0.6767 |
| slider_depth | 0.07662 | 0.06911 | 0.2700 | 0.2942 | 0.7795 | 0.7400 |
| calibration | 0.05052 | 0.04129 | 0.4085 | 0.4109 | 0.6354 | 0.5886 |
| shapes_6dof | 0.03969 | 0.03940 | 0.4116 | 0.4806 | 0.5841 | 0.5609 |
| Average | 0.05889 | 0.04362 | 0.4323 | 0.4711 | 0.6667 | 0.5944 |

Similarly, based on the same inventive concept, another preferred embodiment of the disclosure further provides a computer electronic device corresponding to the method for enhancing event camera image reconstruction by fusing visible images provided in the above embodiments, which includes a storage and a processor.

The storage is configured to store a computer program.

The processor is configured to implement the method for enhancing event camera image reconstruction by fusing visible images as described above when executing the computer program.

In addition, the logical commands in the storage may be implemented in the form of software functional units and may be stored in a non-transitory computer-readable storage medium when sold or used as an independent product. Based on this understanding, the technical solution of the disclosure, or the part that contributes to the related art, or the part of the technical solution, may be implemented in the form of a software product. The computer software product is stored in a storage medium, which includes several commands to allow a computer device (which may be, for example, a personal computer, a server, or a network device) to execute all or part of the steps of the method described in various embodiments of the disclosure.

Therefore, based on the same inventive concept, another preferred embodiment of the disclosure further provides a non-transitory computer-readable storage medium corresponding to the method for enhancing event camera image reconstruction by fusing visible images provided in the above embodiments, the storage medium stores a computer program, and when the computer program is executed by a processor, the method for enhancing event camera image reconstruction by fusing visible images as described above may be implemented.

It may be understood that the storage medium and the storage may adopt random access memory (RAM), and may also adopt non-volatile memory (NVM), such as at least one disk storage. At the same time, the storage medium may also be a U disk, a portable hard disk, a magnetic disk, or a CD, and other media storing program codes.

It may be understood that the processor may be a general-purpose processor, including, for example, a central processing unit (CPU) and a network processor (NP); or the processor may also be a digital signal processor (DSP), application specific integrated circuit (ASIC), field-programmable gate array (FPGA), or other programmable logic devices, discrete gates, or transistor logic devices, discrete hardware components.

Compared with the related art, the disclosure has beneficial effects as follows. To solve the problem that the intensity image reconstructed by the event camera from the event stream is likely affected by noise and lacks of photorealistic, the reconstructed image and the reference image selected from the visible image sequence captured by the optical sensor are used as inputs, texture feature migration is performed on the reconstructed image by the improved Transformer model, which not only makes the reconstructed image close to the natural image recorded by the visible light imaging camera, but also partially suppresses the noise in the reconstructed image.

In addition, it should be noted that persons skilled in the art may clearly understand that for the convenience and simplicity of description, the specific working process of the device described above may be referred to the corresponding process in embodiments of the foregoing method, so details will not be repeated here. In the various embodiments provided in the disclosure, the division of steps or modules in the described devices and methods is only a logical function division, and there may be other division methods in actual implementation, for example, multiple modules or steps may be combined or integrated together, and a module or step may also be divided.

The above are only preferred embodiments of the disclosure, but the protection scope of the disclosure is not limited thereto. Any modifications or replacements made within the spirit and principles of the disclosure shall be covered by the scope of protection of this disclosure.

What is claimed is:

1. A method for enhancing event camera image reconstruction by fusing visible images, comprising:
    S1. dividing event streams produced by an event camera into non-overlapping spatio-temporal windows with a fixed time interval, using the event stream in each of the spatio-temporal windows as an input of a reconstruction module to obtain a reconstructed image of the event stream in each of the spatio-temporal windows;
    S2. for each of the spatio-temporal windows, using a timestamp corresponding to a center position of a spatio-temporal window as a reference moment, taking a nearest visible image before the reference moment and a nearest visible image after the reference moment, which are synchronously captured by the event camera, as a first visible image and a second visible image respectively, and labeling a timestamp of the first visible image as a first moment, and labeling a timestamp of the second visible image as a second moment; if in the spatio-temporal window, a total number of events between the first moment and the reference moment is less than a total number of events between the reference moment and the second moment, then using the first visible image as a reference image corresponding to the spatio-temporal window, otherwise using the second visible image as the reference image corresponding to the spatio-temporal window;

S3. forming a sample pair for each of the spatio-temporal windows, one image in the sample pair is the reconstructed image of the event stream in the spatio-temporal window and the other is the reference image of the spatio-temporal window, inputting the sample pair into an enhancement module, performing texture feature migration on the reconstructed image by the enhancement module and finally outputting an enhanced image, wherein in the event streams produced by the event camera, each event is represented as a quadruple of position coordinates, the timestamp, and an event polarity, values of the event polarity are +1 and −1, +1 represents an event of brightness increase, and −1 represents an event of brightness decrease, wherein in S2, for each of the spatio-temporal windows, when selecting the reference image from the first visible image and the second visible image, a sum of absolute values of the polarities of all events between the first moment and the reference moment is calculated as a first statistical value, a sum of absolute values of the polarities of all events between the reference moment and the second moment is calculated as a second statistical value, if the first statistical value is less than the second statistical value, then the first visible image is selected as the reference image corresponding to the spatio-temporal window, otherwise the second visible image is selected as the reference image corresponding to the spatio-temporal window.

2. The method for enhancing event camera image reconstruction by fusing visible images as claimed in claim 1, wherein the reconstruction module is SPADE-E2VID or Firenet.

3. The method for enhancing event camera image reconstruction by fusing visible images as claimed in claim 1, wherein the enhancement module comprises an input layer, an image feature extraction module, a texture feature extraction module, a correlation calculation module, a feature migration module, and an output layer;

the input layer comprises a convolutional layer followed by a ReLU activation function, the reconstructed image z and the reference image v in the sample pair share the input layer, after being processed by the input layer, a feature map $M_z$ corresponding to the reconstructed image z and a feature map $M_v$ corresponding to the reference image v are output;

the image feature extraction module and the texture feature extraction module are connected in parallel after the input layer, the image feature extraction module comprises five sequentially connected residual modules, the texture feature extraction module adopts a U-Net network; the feature map $M_z$ and the feature map $M_v$ are output as an image feature map Z and an image feature map V respectively after passing through the image feature extraction module, the feature map $M_z$ and the feature map $M_v$ are output as a texture feature map Q and a texture feature map K respectively after passing through the texture feature extraction module; and sizes of the image feature map Z, the image feature map V, the texture feature map Q, and the texture feature map K are the same;

in the correlation calculation module, each position on the texture feature map Q and the texture feature map K are first scanned, during the scanning process, a unique order number is assigned to each of the scanned positions, values of all channels at a scanned position are extracted from the feature map to form a feature vector, the feature vector extracted from the position with an order number i on the texture feature map Q is $q_i$, the feature vector extracted from the position with an order number j on the texture feature map K is $k_j$; a correlation value between a feature vector extracted from each of the positions on the texture feature map Q and a feature vector extracted from each of the positions on the texture feature map K is calculated, for the position with the order number i on the texture feature map Q and the position with the order number j on the texture feature map K, the correlation value is a normalized inner product of the feature vector $q_i$ and the feature vector $k_j$; for any position (m, n) with the order number i on the texture feature map Q, a maximum correlation value between feature vector extracted from this position and vectors from all of the positions on the texture feature map K is searched and stored as S(m, n) in a weight map S, and if a position with an order number j* on the feature map K responses the maximum correlation value, the order number is recorded in a position index map P as P(m, n)=j*, and thereby the weight map S and the position index map P of the same size as the texture feature map Q are generated;

in the feature migration module, according to the position order number j* recorded at each of the positions (m, n) in the position index map P, a position (m', n') on the texture feature map K is determined, all channel values at the position (m', n') are extracted from the image feature map V and used as channel values at the position (m, n) in a reconstructed feature map T, thereby the reconstructed feature map T is formed; then the image feature map Z and the reconstructed feature map T are concatenated along a channel dimension, a concatenated feature map is performed a convolution operation to form a fused feature map $Z_s$, and the fused feature map $Z_s$ and the weight map S are weighted through element-wise multiplication and then added to the image feature map Z, and a feature map $Z_o$ after feature migration is formed; and in the output layer, the feature map $Z_o$ passes through two convolutional layers, follows a Sigmoid activation operation, then a final enhanced image is generated.

4. The method for enhancing event camera image reconstruction by fusing visible images as claimed in claim 3, wherein in the input layer, the convolutional layer comprises 64 convolutional kernels with a size of 3×3×$C_{in}$ and a stride of 1, $C_{in}$ is a number of channels of the reconstructed image and the reference image.

5. The method for enhancing event camera image reconstruction by fusing visible images as claimed in claim 3, wherein for the two convolutional layers in the output layer, a first convolutional layer contains 32 convolutional kernels of 3×3, a second convolutional layer contains 3 convolutional kernels of 3×3, and both of the two convolutional layers are with a stride of 1.

6. The method for enhancing event camera image reconstruction by fusing visible images as claimed in claim 1, wherein network parameters at each layer in the enhancement module are trained in advance using a training sample set; each training sample comprises a set of the reconstructed image, the reference image, and a real visible image correspondingly; the reconstructed image and the reference image are used as inputs to the enhancement module, and the real visible image is used as a ground truth; a total loss function for training is a weighted sum of a structural similarity loss function, a mean square error loss function, and a perceptual loss function; and the perceptual loss function adopts VGG19 as a perceptual model.

7. A non-transitory computer-readable storage medium, wherein a computer program is stored on the storage medium, in response to the computer program being executed by a processor, the method for enhancing event camera image reconstruction by fusing visible images as claimed in claim 1 is realized.

8. A non-transitory computer-readable storage medium, wherein a computer program is stored on the storage medium, in response to the computer program being executed by a processor, the method for enhancing event camera image reconstruction by fusing visible images as claimed in claim 2 is realized.

9. A non-transitory computer-readable storage medium, wherein a computer program is stored on the storage medium, in response to the computer program being executed by a processor, the method for enhancing event camera image reconstruction by fusing visible images as claimed in claim 3 realized.

10. A non-transitory computer-readable storage medium, wherein a computer program is stored on the storage medium, in response to the computer program being executed by a processor, the method for enhancing event camera image reconstruction by fusing visible images as claimed in claim 4 realized.

11. A non-transitory computer-readable storage medium, wherein a computer program is stored on the storage medium, in response to the computer program being executed by a processor, the method for enhancing event camera image reconstruction by fusing visible images as claimed in claim 5 realized.

12. A non-transitory computer-readable storage medium, wherein a computer program is stored on the storage medium, in response to the computer program being executed by a processor, the method for enhancing event camera image reconstruction by fusing visible images as claimed in claim 6 realized.

13. A computer electronic device, comprising a storage and a processor, wherein
the storage is configured to store a computer program;
the processor is configured to, in response to executing the computer program, implement the method for enhancing event camera image reconstruction by fusing visible images as claimed in claim 1.

14. A computer electronic device, comprising a storage and a processor, wherein
the storage is configured to store a computer program;
the processor is configured to, in response to executing the computer program, implement the method for enhancing event camera image reconstruction by fusing visible images as claimed in claim 2.

15. A computer electronic device, comprising a storage and a processor, wherein
the storage is configured to store a computer program;
the processor is configured to, in response to executing the computer program, implement the method for enhancing event camera image reconstruction by fusing visible images as claimed in claim 3.

16. A computer electronic device, comprising a storage and a processor, wherein
the storage is configured to store a computer program;
the processor is configured to, in response to executing the computer program, implement method for enhancing event camera image reconstruction by fusing visible images as claimed in claim 4.

* * * * *